United States Patent [19]

Litchford

[11] 3,866,163
[45] Feb. 11, 1975

[54] ANGLE DATA PROCESSOR FOR RECIPROCATING NARROW SCANNING BEAMS

[75] Inventor: George B. Litchford, Northport, N.Y.

[73] Assignee: The United States of America as represented by the Secretary of the Air Force, Washington, D.C.

[22] Filed: July 2, 1973

[21] Appl. No.: 375,557

[52] U.S. Cl............ 340/24, 343/106 R, 343/108 M
[51] Int. Cl................................................. G01s 1/18
[58] Field of Search...... 343/108 M, 106 R; 340/24, 340/27 R, 27 NA

[56] References Cited
UNITED STATES PATENTS

| | | | |
|---|---|---|---|
| 2,587,995 | 3/1952 | Griggs | 343/108 M |
| 2,977,592 | 3/1961 | Bruck | 343/108 M |
| 3,202,994 | 8/1965 | Fombonne | 343/108 M |
| 3,349,399 | 10/1967 | Bohm | 343/108 M |

Primary Examiner—John W. Caldwell
Assistant Examiner—Marshall M. Curtis
Attorney, Agent, or Firm—Harry A. Herbert, Jr.; William Stepanishen

[57] ABSTRACT

An angle data processor apparatus utilizing a pair of phase-locked oscillator to determine the phase difference between transmitted reciprocating scanning beams. The phase difference being displayed to provide glide angle information.

8 Claims, 2 Drawing Figures

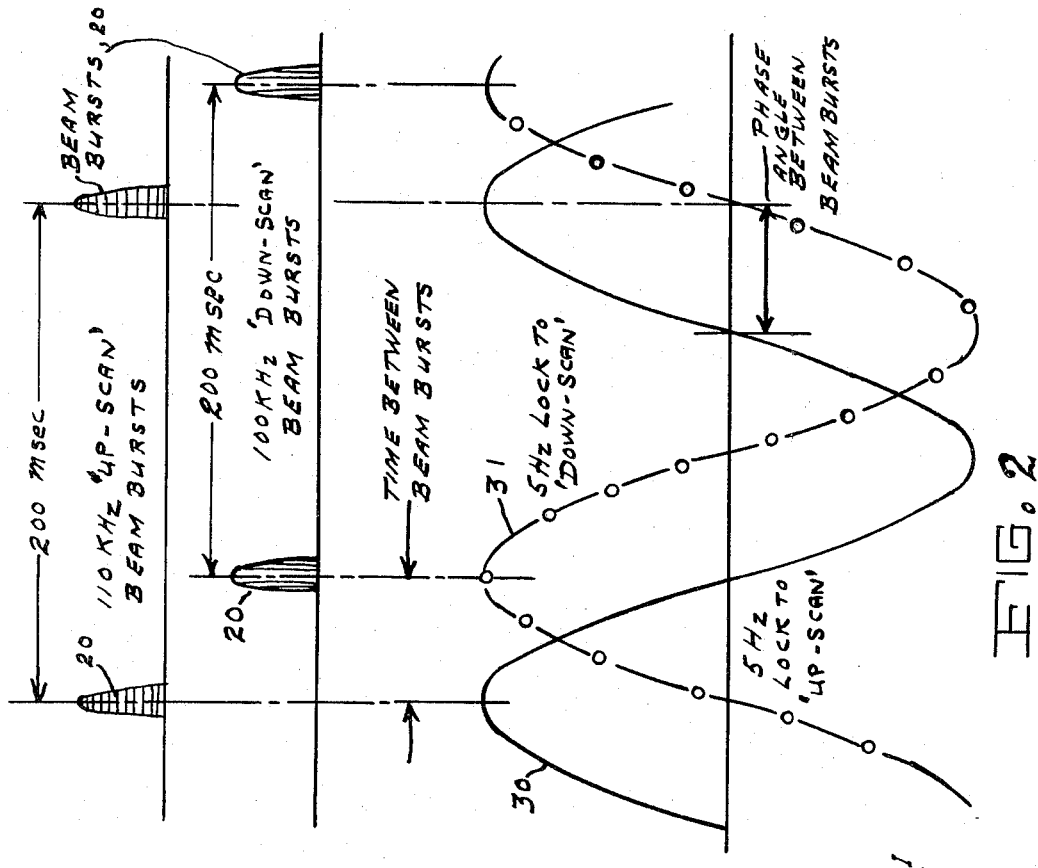
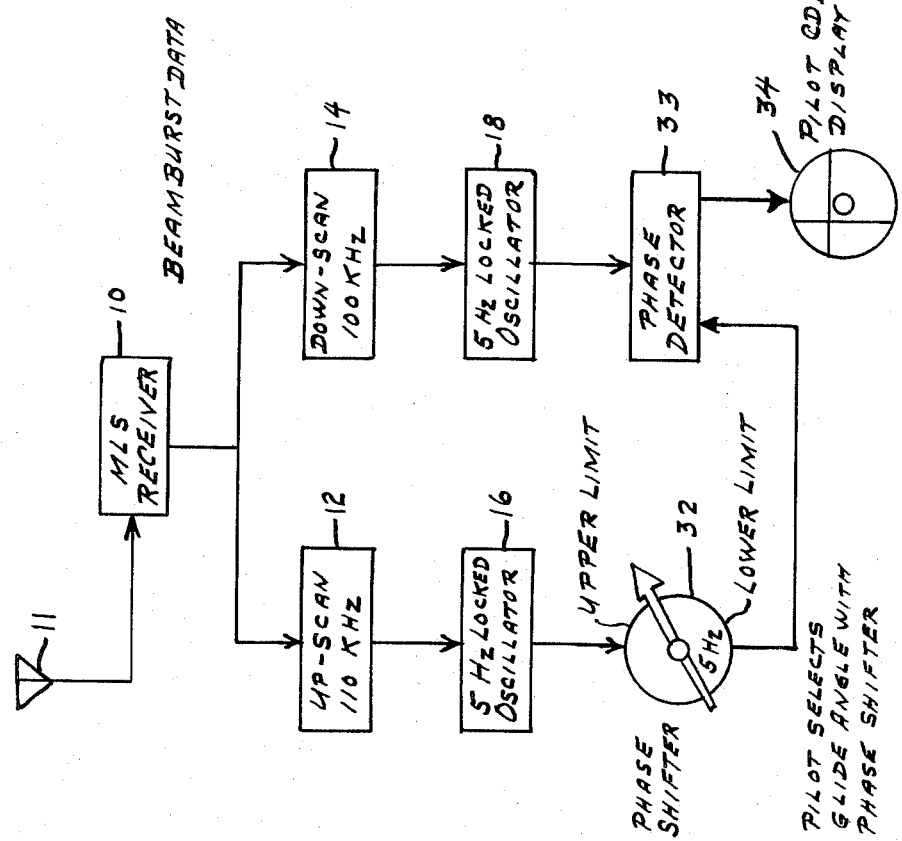

3,866,163

ANGLE DATA PROCESSOR FOR RECIPROCATING NARROW SCANNING BEAMS

BACKGROUND OF THE INVENTION

The present invention relates broadly to an aircraft landing system and in particular to a microwave landing system for determining aircraft glide angle during landing.

Previous landing systems for aircraft have been arranged for affording positional signals in a very limited range of azimuth and elevation. In such systems, the precision of guidance usually is limited even with the narrow guidance range. Also, most previous fixed-path systems fall short of optimum guidance for the wide variety of landing characteristics possessed by the various types of aircraft which are prevalent.

There have been many attempts to implement an instrument landing system which can overcome the limitations of the present equipment. Thus far, none of the proposed equipment concepts have achieved wire acceptance for a number of reasons. In general, the new systems require extensive aircraft modification and large complex ground installations, as well as a large maintenance program due to their complexity. The present invention provides a simplified glide angle apparatus which may be used as a navigational aide in landing an aircraft.

SUMMARY

The present invention utilizes a microwave receiver to receive an up-scan and a down-scan signal which is transmitted from a ground installation. The phase difference between the two signals is detected and displayed to provide glide angle information. The up-scan and down-scan signals are utilized to respectively lock two oscillators to their individual beam burst.

It is one object of the invention, therefore, to provide an improved angle data processor apparatus to discriminate the phase difference between an up-scan and a down-scan signal.

It is another object of the invention to provide an improved angle data processor apparatus to derive the glide angle of an aircraft from transmitted reciprocating narrow scanning beams.

It is yet another object of the invention to provide an improved angle data processor apparatus utilizing a microwave landing system for an aircraft which is conservative of frequency spectrum and adapted for simplification of aircraft receiver requirements while meeting the great demands for good guidance capabilities throughout a great volume of aircraft positions.

These and other advantages, objects and features of the invention will become more apparent from the following description taken in connection with the illustrative embodiment in the accompanying drawings.

BRIEF DESCRIPTION OF THE DRAWINGS

FIG. 1 is a block diagram of the angle data processor apparatus utilizing phase lock oscillators to detect the phase differences between reciprocal beam bursts, and, FIG. 2 is a graphical representation of the phase differences and the relationships between the transmitted reciprocating beam bursts and the phase locked oscillators.

DESCRIPTION OF THE PREFERRED EMBODIMENT

Referring now to FIG. 1, there is shown an angle data processor apparatus utilizing an MLS receiver 10 which is connected to antenna 11 to receive transmitted reciprocating narrow scanning beams. The designation MLS receiver is defined herein as a microwave landing system (MLS) receiver. The MLS receiver 10 may be any conventional microwave receiver such as is well known to those skilled in the art. In the present example, the transmitted reciprocating narrow scanning beams will be a microwave carrier which is modulated in the up-scan direction by a 110 kHz signal and in the down-scan direction by a 100 kHz signal. The frequency of the vertical scanning of the beams, i.e. the upscan and the down-scan is 5 Hz. In other words, the ground based transmitter which is transmitting the scanning beams is reciprocating vertically at a 5 Hz rate, such that the up-scan and the down-scan signals are effectively oscillating vertically with respect to the ground at 5 Hz.

The MLS receiver 10 receives the transmitted reciprocating scanning beams and demodulates the carrier to provide a 110 kHz up-scan and a 100 kHz down-scan output signal. The output signal from the MLS receiver 10 is the beam burst data which is shown in FIG. 2. There is shown in FIG. 2, the beam burst for the up-scan signal and the beam burst for the down-scan signal. The beam burst signals 20 have a period of 200 milliseconds between their respective pulse which is the scan rate respectively of 5 Hz.

The output signal of the MLS receiver 10 is applied to the up-scan unit 12 and the down-scan unit 14 which may be conventional demodulating units operating respectively at 110 kHz and 100 kHz. The up-scan and the down-scan units 12, 14 may also be a conventional demodulation filter which passes only the frequency of interest, in the present example, 110 kHz and 100 kHz. The output of the up-scan and the down-scan units 12, 14 is a 2 millisecond pulse respectively which represents the beam bursts. These pulses are utilized respectively to lock the 5 Hz locked oscillators 16, 18. The locked oscillators 16, 18 are conventional phase locked oscillators of the type found in the reference book, "Phase Lock Techniques" written by F. M. Gardner and published by John Wiley and Sons. The pulses from the scan units 12, 14 trigger the locked oscillators 16, 18 to oscillate at 5 Hz in response to the applied pulses. The outputs of the oscillators 16, 18 have a phase difference between them which is equal to the time difference between the respective up-scan and down-scan beam bursts 20 in FIG. 2.

In FIG. 2, the output signal 30 of locked oscillator 16 is shown having some phase angle with the output signal 31 of locked oscillator 18. The phase angle between the two oscillator signals is directly related to the glide angle of an aircraft and a visual display means may be provided to read out the glide angle directly in degrees. The system shown in FIG. 1 incorporates a phase shifter 32 which enables the setting of a predetermined glide angle or phase difference as a reference. In such a case, a given phase difference could be established as a selected glide path and displayed on a viewing means, such as a galvanometer capable of reading plus or minus deviations. The galvanometer may be calibrated in terms of angular deviation to be read directly by a pilot.

The output signals from the phase shifter 32 and the oscillator 18 are applied to a phase detector 33 wherein the phase of both signals are detected. The output of the phase detector 33 is applied to a pilot course deviation indicator (CDI) display 34. As was earlier noted, the CDI display 34 may be a galvanometer wherein half scale deflection is established as zero course deviation. The zero course deviation of glide angle may be preselected by a pilot by adjusting the phase shifter 32 which is variable between an upper and lower limit to present a α zero deviation on CDI display 34. In the present example, the up-scan signal has been selected as the reference signal and the down-scan signal is the variable signal from which the glide angle is derived. However, it should be noted that either scanning signal may be selected as the reference signal and the other as the variable.

The present invention utilizes reciprocal scanning beams and phase comparisons therebetween to individually lock two oscillators to the individual beam bursts. One airborne oscillator is locked to the 110 kHz suggested (as an example) for up-scans and the other oscillator (isolated from the first) is locked to the 100 kHz or down-scans. Depending upon the location of the aircraft in the scan sector, the time between the two directions has been shown to vary, as does the phase angle of the 5 Hz oscillators shown in FIG. 2. The pilot, to select a course, turns a phase shifter that selects a given angle in the scan sector. For example, he might select a course ±2 degrees wide out of a 0 to 30-degree vertical sector. Effectively, the up-scan can be the "reference" phase and the down-scan the "variable" phase. This is shown in FIG. 1 where one direction of scan is used as the time reference. It is the change in the phase angle between the two 5 Hz signals that is measured in this narrow scanning beam concept to provide the glide angle data.

Although the invention has been described with reference to a particular embodiment, it will be understood to those skilled in the art that the invention is capable of a variety of alternative embodiments within the spirit and scope of the appended claims.

What is claimed is:

1. An angle data processor apparatus for reciprocating narrow scanning beams comprising in combination:
   means for receiving first and second scanning signals, said first and second scanning signals being respectively modulated, said means for receiving detecting said first and second scanning signals and providing first and second detected output signals,
   a first demodulating means receiving said first detected output signal from said means for receiving, said first demodulating means operating at a first demodulating frequency, said first demodulating means demodulating said first detected output signal to provide a first output pulse train in response to said first detected output signal,
   a second demodulating means receiving said second detected output signal from said means for receiving, said second demodulating means operating at a second demodulating frequency, said second demodulating means demodulating said second detected ouput signal to provide a second output pulse train in response to said second detected output signal,
   a first oscillator for oscillating at a first predetermined frequency, said first oscillator being connected to said first demodulating means and receiving said first output pulse train, said first oscillator being triggered by said first output pulse train, said first predetermined frequency being in response to said first output pulse train,
   a second oscillator for oscillating at a second predetermined frequency, said second oscillator being connected to said second demodulating means and receiving said second output pulse train, said second oscillator being triggered by said second output pulse train, said second predetermined frequency being in response to said second output pulse train,
   detecting means for receiving said first and second predetermined frequencies, said detecting means detecting the phase difference between said first and second predetermined frequencies, said detecting means providing a voltage output signal in response to said phase difference, and
   a display means receiving said voltage output signal, said display means providing a visual display of said voltage output signal.

2. An angle data processor apparatus as described in claim 1 further including phase shifting means connected to said first oscillator to receive said first predetermined frequency, said phase shifting means having an upper and lower predetermined limit, said phase shifting means shifting in phase said first predetermined frequency between said upper and lower predetermined limit to provide a reference signal, said reference signal being applied to said detecting means, said detecting means detecting the phase difference between said reference signal and said second predetermined frequency and providing a voltage output in response thereto.

3. An angle data processor apparatus as described in claim 1 wherein said first and second scanning signals are modulated at 100 kHz and 110 kHz respectively.

4. An angle data processor apparatus as described in claim 1 wherein said first and second scanning signals have a vertical scanning rate of 5 Hz.

5. An angle data processor apparatus as described in claim 1 wherein said first and second demodulating means are filters respectively tuned to said first and second demodulating frequencies.

6. An angle data processor apparatus as described in claim 1 wherein said first and second pulse output trains respectively are 5 Hz.

7. An angle data processor apparatus as described in claim 1 wherein said first and second predetermined frequencies are 5 Hz.

8. An angle data processor apparatus as described in claim 1 wherein said display means being calibrated to provide a preselected glide angle, said display means displaying positive and negative deviations in glide angle from said preselected glide angle.

* * * * *